June 5, 1962 T. A. LARRY 3,037,521
SERVICE T
Filed March 4, 1958 3 Sheets-Sheet 1
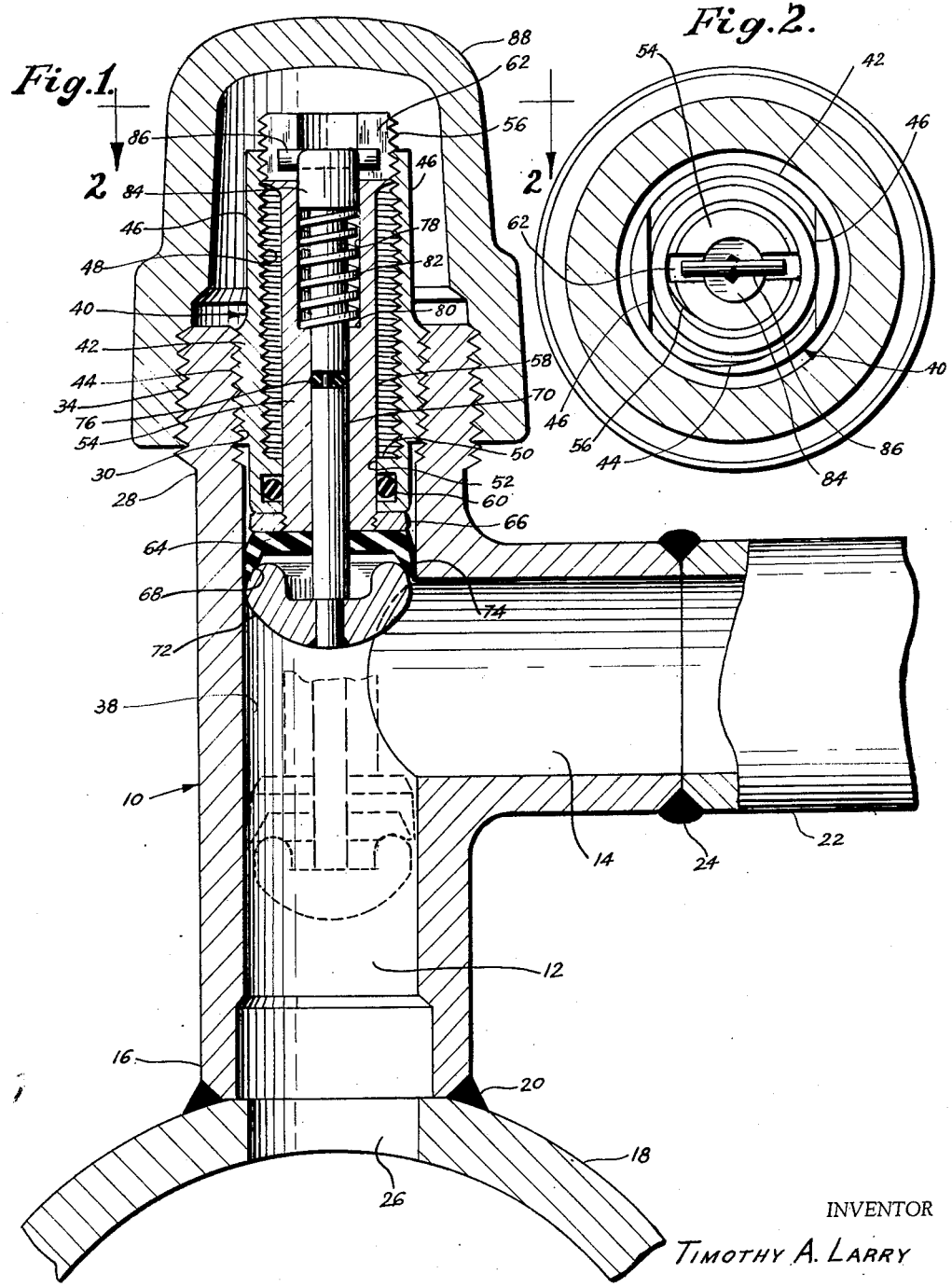
INVENTOR
TIMOTHY A. LARRY
BY Cushman, Darby & Cushman
ATTORNEYS June 5, 1962 T. A. LARRY 3,037,521
SERVICE T Filed March 4, 1958 3 Sheets-Sheet 2

INVENTOR
TIMOTHY A. LARRY

BY Cushman, Darby & Cushman
ATTORNEYS

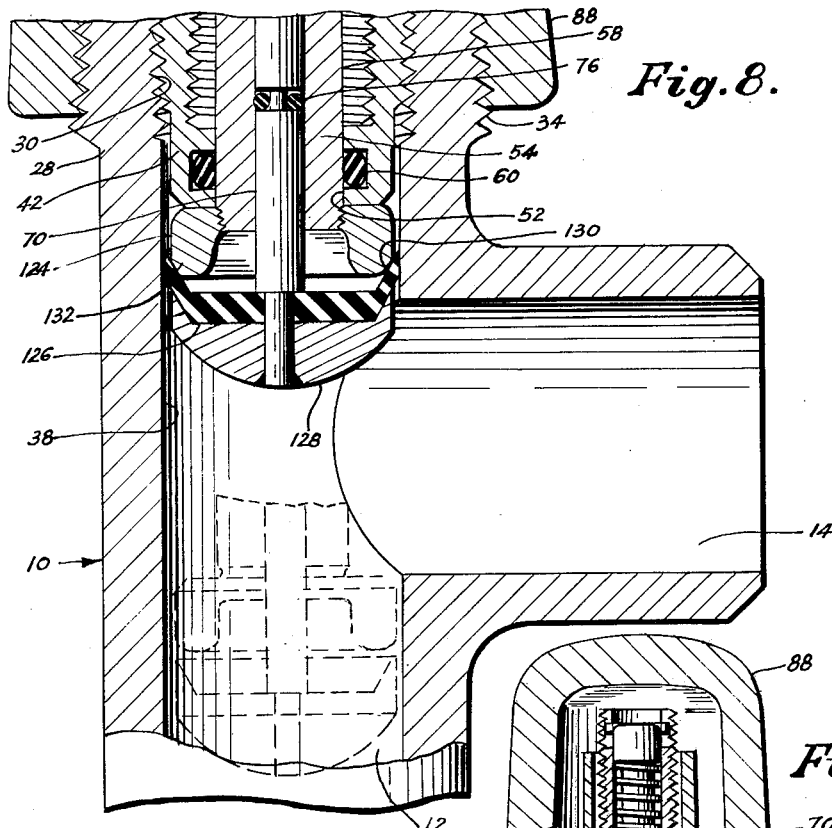
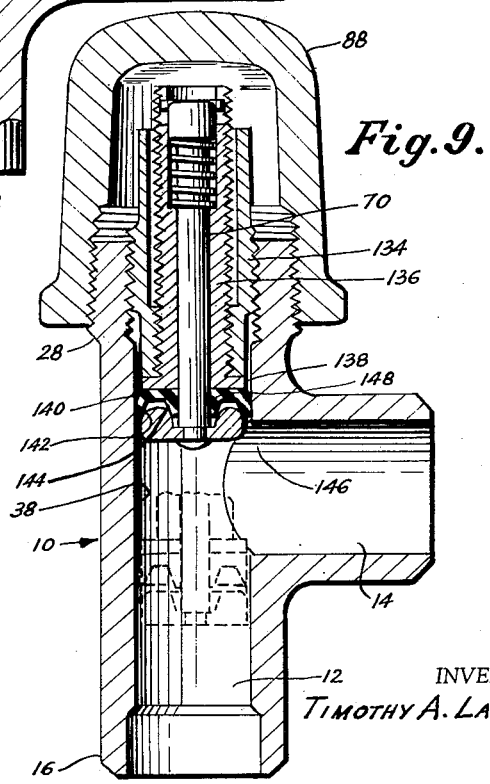
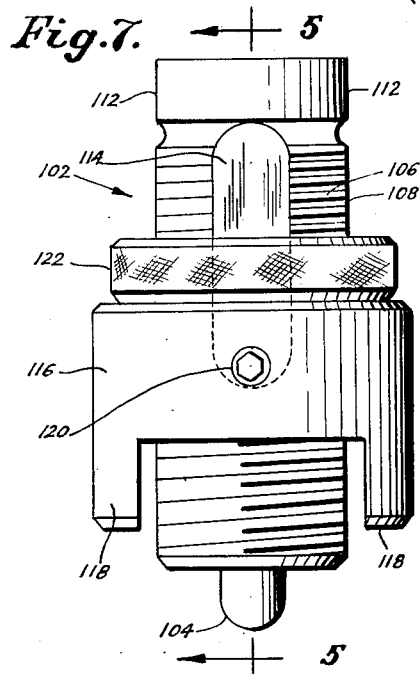
INVENTOR
Timothy A. Larry

United States Patent Office 3,037,521
Patented June 5, 1962

3,037,521
SERVICE T
Timothy Allan Larry, San Clemente, Calif., assignor to Mueller Co., Decatur, Ill., a corporation of Illinois
Filed Mar. 4, 1958, Ser. No. 719,056
3 Claims. (Cl. 137—315)

This invention relates to service T's of the type adapted to connect a gas or water main to a service pipe leading to a building. More particularly, this invention relates to a valve assembly for converting a service tee of the aforedescribed type that is not equipped with a valve to a valve-type service T.

Many service T's of the type with which this invention is concerned are presently in use, and usually were installed without escape of fluid from the main to the atmosphere by a method similar to that disclosed in the patent to Mueller No. 1,996,345. Although many service T's now in use are of the valve type illustrated, for example, in the patent to Henderson No. 2,336,173, probably the majority of installed service T's do not have built-in valves and are of what may be termed the plain type illustrated, for example, in the aforementioned patent to Mueller No. 1,996,345 and also in the patents to Mueller et al. No. 2,482,687 and to Smith No. 2,756,486.

Although service may be shut off in a plain service T by use of expansible stoppers or plugging units, together with appropriate operating equipment, of the type illustrated, for example, in the aforementioned patents to Mueller et al and to Smith, it frequently becomes desirable to convert a plain service T to one of the valve type so that in the event it becomes necessary, service may be shut off from the main to the service pipe readily and without delay. Such a necessity may arise for various reasons, such as the discovery of a leak in the service pipe. When a service T is equipped with a valve, it is unnecessary to resort to the aforementioned expensive and time-consuming stopper-operating equipment in order to shut off flow from the main to the service pipe.

The conversion of a plain service T to one of the valve type is rendered somewhat difficult, however, for the reason that there is no built-in valve seat and also the bore of the T usually is unfinished, so that, in fact, the wall of the bore is quite rough and tends to cut and damage any expansible valve element of rubber or the like, that may be slid along the wall.

Accordingly, it is an object of this invention to provide an assembly for converting a plain service T to one of a valve type.

It is another object of this invention to provide such a conversion assembly that may readily be installed in a plain service T without the escape of fluid to the atmosphere.

It is still another object of this invention to provide such a conversion assembly that may be installed with equipment presently in use, and with the necessity of only one additional piece of special equipment that is relatively inexpensive.

It is a further object of this invention to provide a conversion assembly of the type under consideration that is inexpensive to manufacture, easy to install, may be operated with facility to shut off flow of fluid from a main to a service pipe, and which is undamaged by many cycles of operation.

It is still another object of this invention to provide a relatively simple special tool for facilitating the installation of a conversion assembly embodying this invention.

Other objects and advantages will become apparent from the following description and accompanying drawings, in which:

FIGURE 1 is a vertical sectional view of a plain service T installed between a main and a service pipe and equipped with a conversion assembly embodying this invention.

FIGURE 2 is a sectional view taken substantially on line 2—2 of FIGURE 1.

FIGURE 7 is a side elevational view of the tool shown in FIGURE 5.

FIGURE 8 is a fragmentary sectional view corresponding to FIGURE 1, but illustrating a modified form of conversion assembly embodying this invention.

FIGURE 9 is a view corresponding to FIGURE 1 but illustrating still another modified form of conversion assembly embodying this invention.

Figure 3:
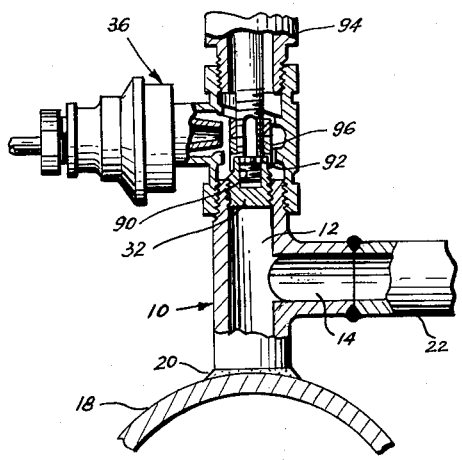
FIGURE 3 is a fragmentary vertical sectional view illustrating the operation of removing the usual threaded closure plug from the top of a plain service T preparatory to installing a conversion assembly embodying this invention.

Referring to FIGURES 1 and 2 of the drawings, there is shown a plain service T 10 provided with a through bore 12 and a lateral outlet 14. The inlet end 16 of the T 10 is connected to a main 18, as by welding 20, while the lateral outlet 14 is connected to a service pipe 22, as by welding 24. The main 18 has been drilled to provide an opening 26 in alignment with the T bore 12 in order to establish service, i.e., flow from the main through the T 10 to the service pipe 22.

The upper or outer end 28 of the T 10 is provided with interior threads 30 for reception of the usual closure plug 32, as shown in FIGURE 3, and exterior threads 34 for connection of the usual completion cap (not shown) or for connection of one end of a gate valve 36 (FIGURES 3 and 4) through which tools may be manipulated, as later described. Extending between the interior threads 30 and the inlet end 16 of the T 10, and also past and on opposite sides of the lateral outlet 14, is a section 38 of the through bore 12 of substantially uniform diameter. Usually this bore section 38 is unfinished and, consequently, quite rough.

Installed in the T 10 is a conversion assembly 40 embodying this invention. The assembly 40 includes a bushing 42 provided, for a majority of its length, with exterior threads 44 adapted to engage with the interior threads 30 at the outer end 28 of the T 10 to fasten and seal the bushing therein. At the outer end of the bushing 42 the threads 44 are interrupted, such as by diametrically opposite flats 46 (FIGURE 2) to provide a non-circular exterior configuration for purposes later described. At its inner end the bushing 42 is unthreaded and reduced in diameter to project into the T outer end 28 beyond the interior threads 30. Extending inwardly from its outer end, and for a major portion of its length, the bushing 42 is provided with interior threads 48 that terminate in an upwardly or outwardly facing annular shoulder 50 formed by a restriction in the form of a smooth-walled bore section 52 at the inner end of the bushing.

Disposed within the bushing 42 is a tubular valve-carrying stem 54 having exterior threads 56 at its outer end engaged with the interior threads 48 of the bushing. Inwardly of its threads 56, the stem 54 is reduced in diameter and provided with a smooth cylindrical section 58 complementary to and slidably engaged within the smooth-walled bore 52 in the bushing 42. Preferably, a seal is provided between the stem 54 and the bushing 42, as by means of an O-ring 60 disposed in an interior circumferential groove in the bushing bore section 52. The outer end of the stem 54 is provided with a non-circular recess arrangement, such as a diametric kerf 62, for the reception of a turning tool, such as a screw driver (not shown) to screw the stem into or out of the bushing 42 to thereby move the inner end of the stem along the T bore section 38 from one side to the other of the lateral outlet 14 of the T 10.

Carried on the inner end of the stem 54 is an expansible valve element in the form of a cup-shaped resilient washer 64, of rubber or the like. The concave side of the washer 64 faces the inlet end 16 of the T 10, while the base of the washer rests against the inner end of the stem 54 and, preferably, is backed by a circumferential flange 66 on the inner end of the stem. This flange 66, for convenience of assembly, may be in the form of a circular nut threaded onto the inner end of the stem 54. When relaxed, the exterior peripheral surface of the washer 64 is in the form of a cylinder of a diameter slightly less than the interior diameter of the bore section 38 of the T, as illustrated in dotted lines in FIGURE 1 of the drawings and shown in full lines in FIGURE 4. Preferably, the lip 68 of the washer 64 tapers towards its edge, so that the interior surface of the lip is inclined.

Extending snugly through the bore of the stem 54 and snugly through the washer 64 is an expander rod 70 having secured on the inner end thereof, as by welding, a circular expander member 72. The member 72 is provided with an inclined outer annular surface 74 adapted to engage with the inclined inner surface of the lip 68 of the washer 64, on being moved axially thereagainst, to expand the washer and force its lip radially outwardly into sealing engagement with the bore section 38 of the T 10, as illustrated in FIGURE 1. Preferably, a seal between the rod 70 and the stem 54 is provided as, for example, by means of an O-ring 76 disposed in a circumferential groove in the rod in position to engage and seal with the bore of the stem.

The outer end of the bore of the stem 54 is interiorly enlarged, as at 78, to provide an outwardly facing shoulder 80 against which is engaged one end of a coil compression spring 82. The other end of the spring 82 engages against an enlarged head 84 secured on the outer end of the rod 70 to thereby constantly urge the rod outwardly, and consequently, the expander 72 into expanding engagement with the washer 64.

Preferably, the enlarged head 84 on the rod 70, when the expander 72 is in expanding engagement with the washer 64, does not project outwardly beyond the outer end of the stem 54 but is positioned outwardly beyond the inner end or bottom of the kerf 62. Consequently, it will be seen that when a turning tool, such as a screw driver (not shown), is inserted into the kerf 62 in order to screw the stem 54 inwardly or outwardly, and thereby move the valve element 64 along the bore section 38 of the T 10, the rod 70 will automatically be pushed inwardly against the force of the spring 82 and move expander 72 out of engagement with the washer 64. The latter, because of its inherent resiliency, then will automatically contract out of engagement with the unfinished wall of the bore section 38. Hence, the washer 64 can be moved along the bore section 38 without incurring any cutting or damage of such washer.

It will be seen that the parts are so proportioned that when the stem 54 is unscrewed outwardly to its full extent, the washer 64 is positioned outwardly beyond the lateral outlet 14 of the T 10 so as not to interfere unduly with the free flow of fluid from the main 18 through the T bore 12 and into the lateral outlet. At the same time, the stem 54 is long enough so that it can be screwed inwardly to an extent sufficient to locate the washer 64 at a position in the T bore section 38 between the T inlet end 16 and the lateral outlet 14, as shown in dotted lines in FIGURE 1. Consequently, in such position, when the turning tool, such as the aforementioned screw driver, is removed from the kerf 62 in the stem 54, the washer 64 will again be expanded by the expander 72 into sealing engagement with the bore section 38 and thereby shut off flow from the main 18 to the service pipe 22. In this connection, it will be seen that because the concave side of the washer 64 faces the inlet end 16 of the T 10, the washer lip 68, when once in sealing engagement with the wall of the T bore section 38, will be responsive to fluid pressure in the main 18 to maintain such sealing engagement. In other words, as the pressure increases, the tightness of the seal will increase.

Preferably, the outer end of the rod 70 has secured thereto, as by spot welding, a transverse pin 86, the opposite ends of which project slightly into the kerf 62 on opposite sides of the enlarged bore section 78 of the stem in order to prevent relative rotary movement between the stem 54 and the rod 70 which might possibly result in unthreading the nut 66 on the inner end of the stem. After the assembly 40 has been installed in a T, a closure cap 88 preferably is threaded onto the outer end 28 of the T 10 to protect the assembly when not being operated.

Figure 4:
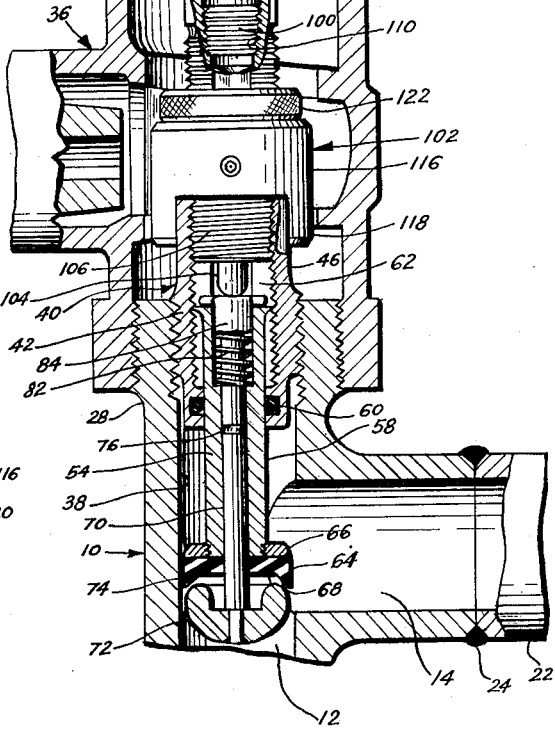
FIGURE 4 is an enlarged fragmentary vertical sectional view corresponding to FIGURE 3, but illustrating the operation of installing a conversion assembly embodying this invention.

Referring now to FIGURES 3 and 4 of the drawings, there is illustrated the method of installing a conversion assembly embodying this invention in a conventional plain service T 10 without the escape of fluid to the atmosphere. An installed plain service T 10 usually is equipped with a threaded closure plug 32 engaged with the interior threads 30 in the outer end 28 of the T, as shown in FIGURE 3. The outer end of such plug 32 also conventionally is provided with an interiorly threaded socket 90 surrounded by a boss 92 of non-circular outer configuration, such as provided by diametrically disposed flats. The first step in the installation of the conversion assembly 40 is to remove the closure plug 32. This is done by attaching to the outer end of the T 10, after first removing the usual closure cap (not shown), one end of a gate valve 36. A closed machine 94 of well known construction through which tools may be manipulated without escape of fluid to the atmosphere is attached to the other or outer end of the gate valve 36. Then, by means of an extracting tool 96 of known construction that is threaded into the plug socket 90 and engaged with the flats on the plug boss 92, as illustrated in FIGURE 3 of the aforementioned Mueller Patent No. 1,996,345, and described in detail therein, the plug 32 can be removed in a known manner from the T 10 without escape of fluid to the atmosphere.

Thereupon, the gate valve 36 is closed and the machine 94 detached therefrom so that the extracting tool 96 and plug 32 can be removed and replaced by a known type of inserting tool 98, shown in FIGURE 4. Such a tool 98, which is illustrated and described in detail in the aforementioned Mueller Patent No. 1,996,345, has a reduced and threaded inner end 100. Detachably secured on the inner end 100 of the inserting tool 98 is a special carrier assembly 102 for carrying a conversion assembly 40 embodying this invention, as illustrated in FIGURE 4 of the drawings. The machine 94 is then reattached to the outer end of the gate valve 36, the latter opened, and by appropriate manipulation of the inserting tool 98, the conversion assembly 40 is pushed through the gate valve and screwed into the outer end 28 of the service T 10, as shown in FIGURE 4. The carrier assembly is provided with a projection 104 which, when a conversion assembly is attached to the carrier, engage and pushes the rod 70 inwardly to contract the washer 64. Hence, it will be seen that the washer 64 will be out of engagement with the unfinished bore 38 of the T 10 during the entire installation operation so as not to become damaged by such operation.

Figure 5:
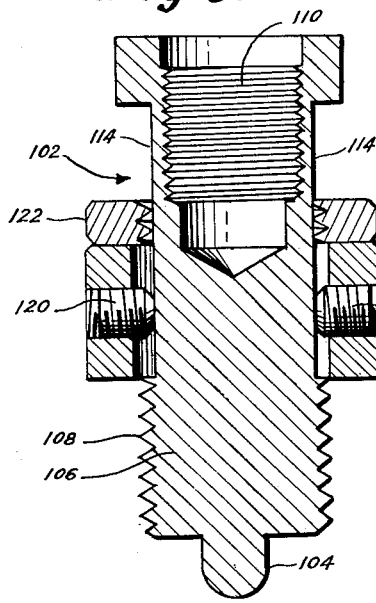
FIGURE 5 is an enlarged vertical sectional view taken along the line 5—5 of FIGURE 7 of the special tool illustrated in FIGURE 4 for installing a conversion assembly embodying this invention.
Figure 6:
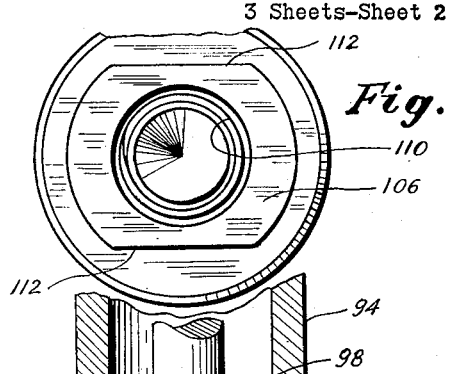
FIGURE 6 is a plan view of the tool shown in FIGURE 5.

The special carrier assembly 102 embodying this invention comprises a generally cylindrical body 106 that is provided with exterior threads 108 for a major portion of its length. At its upper end the body 106 is provided with an interiorly threaded socket 110 for the reception therein of the threaded end 100 of the inserting tool 98, as shown in FIGURE 4. Above or outwardly beyond the threads 108 the body 106 is exteriorly enlarged and provided with a non-circular outer configuration, such as the diametric flats 112 best shown in FIGURE 6 of the drawings. Extending from the exteriorly enlarged part of the body 106 to a point above the lower end thereof, are a pair of diametrically opposite flats 114 which interrupt the threads 108. Slidably mounted on the body 106 is a wrench-like yoke 116 provided with forwardly extending wings 118 that have flat inner sides adapted to engage the flats 46 on the outer end of the bushing 42 of the conversion assembly 40, as shown in FIGURE 4. Relative rotation between the yoke 116 and the body 106 is prevented by set screws 120 in the yoke that ride against the body flats 114. It also will be seen, from an inspection of FIGURE 5, that these set screws 120 limit the extent of longitudinal movement of the yoke 116 on the body 106. Threaded onto the body 106 outwardly of the yoke 116 is a knurled nut 122, while the forward end of the body is provided with the reduced coaxial projection 104 that is adapted to extend into the stem 54 of the conversion assembly and move the rod 70 inwardly to disengage the expander 72 from the washer 64.

In the use of the carrier 102, the stem 54 of the conversion assembly 40 is first screwed inwardly into the bushing 42 somewhat until it reaches a position wherein the body 106 of the carrier can be threaded into the outer end of the bushing to the extent, shown in FIG. 4, wherein the projection 104 on the body will engage and depress the rod 70 sufficiently to effect contraction of the valve washer 64. In this position of the parts, the yoke 116 can be slid forwardly on the body 106 and into engagement with the flats 46 on the outer part of the bushing 42. Thereupon, the knurled nut 122 is screwed forwardly to lock the yoke 116 in such engagement. Thus, it will be seen that not only is the assembly 40 retained on the carrier 102 but also rotation of the body 106 of the latter will effect rotation of the bushing 42 of the conversion assembly 40.

The inserting tool 98 is then screwed into the outer end of the body 106 of the carrier 102 so that by appropriate manipulation of the inserting tool the conversion assembly 40 can be moved down through the gate valve 36 and threaded into the outer end of the T 10, as shown in FIGURE 4. In this position, it will be seen that the outer end 28 of the T 10 is completely sealed by the engagement between the threads 44 on the bushing 42 and the interior threads 30 in the T outer end 28 and also because of the O-ring seals 60 and 76. Consequently, the gate valve 36 can be unscrewed from the outer end of the T 10 and the gate valve, together with the machine 94 slid outwardly or upwardly off of the inserting tool 98. Thereupon, the nut 122 can be unscrewed to allow the yoke 116 to be slid out of engagement with the bushing 42. The flats 46 on the latter can then be engaged by a wrench (not shown) while another wrench (not shown) is engaged with the flats 112 on the outer end of the body 106 of the carrier 102 so that the latter can be unthreaded from the bushing of the conversion assembly 40. The latter can then be tightened, if need be, into the T 10 and is ready for use, either to shut off flow through the T, as previously described, or be moved into a fully open position to permit substantially unobstructed flow through the T. Preferably, when the conversion assembly 40 is not being operated, the T outer end 28 is provided with the closure cap 88.

Referring now to FIGURE 8 of the drawings, there is shown a modified form of this invention, wherein the expander 124 is carried on the inner end of the stem 54 of the conversion assembly, in place of the back-up flange or nut 66, and the expansible cup-washer 126 is carried on the inner end of the rod 70 with the concave side of the washer facing away from the inlet end 16 of the T 10. The washer 126 is backed by an enlarged disk 128 secured, as by welding, on the inner end of the rod 70. In this modification, as the rod 70 is moved outwardly of the stem 54, the inner surfaces of the lip 130 of the cup-washer 126 are brought into engagement with the inclined outer annular surface 132 of the expander 124 to expand the washer radially outwardly into sealing engagement with the wall of the bore section 38 of the T 10.

Although it will be seen that the seal effected by the cup washer 126 is not pressure-responsive, as is the case with the embodiment illustrated in FIGURE 1, the modification illustrated in FIGURE 8 has an advantage. In particular, it will be noted that in the embodiment illustrated in FIGURE 1, when flow has been shut off through the T 10 by moving the washer 64 to the dotted line position shown in FIGURE 1 and expanding the washer in such position, when the expander 72 is moved out of engagement with the washer 64 preparatory to moving the latter to its open position shown in solid lines in FIGURE 1, the pressure against the concave side of the cup washer 64 tends to maintain it expanded into sealing engagement with the wall of the bore section 38. Consequently, when the lip 68 of the cup washer 64 just passes the inner edge of the lateral outlet 14 where the latter intersects the bore 38, in the outward movement of the washer with the stem 54, the aforementioned pressure tends to force the lip 68 into the lateral outlet and thereby possibly damage the lip. This disadvantage is completely avoided by the construction shown in FIGURE 8, because in the shut-off position of the cup washer 126, i.e., in the dotted line position shown in FIGURE 8 wherein the washer is out of engagement with the expander 124, the washer automatically retracts out of sealing engagement with the wall of the bore section 38, and such retraction is helped rather than hindered by pressure in the main 18. Consequently, in the outward movement of the washer 126 from its closed to its open position by the stem 54, there is no tendency for the lip 130 of the washer to be damaged in its movement past the inner edge of the lateral outlet 14.

Referring now to FIGURE 9 of the drawings, there is shown still another modified form of the invention. In this embodiment the inner end of the bushing 134 is provided with interior threads engaged with complementary threads on the stem 136 that extend substantially throughout the entire length of the latter. The back-up flange 138 for the valve washer 140 on the inner end of the stem 136 may be integral with the latter because the stem is threaded throughout its entire length outwardly beyond such flange. In this embodiment, the valve washer 140 not only has an outer peripheral lip 142 similar to the construction shown in FIGURE 1, but also an inner peripheral lip 144 surrounding the rod 70, so that the washer may be said to be substantially U-shaped in radial section having inner lip surfaces that converge toward the base of the U. Similarly, the expander 146 is provided with an annular inclined inner surface 148 for engagement with the inner surface of the inner lip 144 of the washer 140. Consequently, the action of the expander 146 is not only to expand the outer lip 142 of the washer into its sealing engagement with the wall of the bore section 38 of the service T 10, but also to contract the inner lip 144 of the washer 140 into sealing engagement about the rod 70. Thus, when the expander 146 is so engaged, a tight seal is effected, both with the wall of the bore section 38 and about the rod 70, which prevents leakage out of the outer end of the T 10.

Since it is only when the stem 136 is being screwed outwardly or inwardly of the bushing 134 that the washer 140 does not effect a seal with the bore section 38, it is possible, in this construction, to eliminate O-ring seals, such as 60 and 76 in the construction shown in FIGURES 1 and 8, because the amount of leakage of fluid outwardly between the bushing 134 and the stem 136, and between the latter and the rod 70, will be slight and, even then, will take place only when the stem is being screwed inwardly or outwardly of the bushing. Furthermore, in this modification of the invention, it will be seen that the inner lip 144 of the washer 140 is, at all times, responsive to pressure to effect a tighter seal about the rod 70. Furthermore, the base of the washer 140 is responsive to pressure to effect a tighter seal between the back-up flange 138 and the washer. Consequently, leakage between the stem 136 and the rod 70 will be practically non-existent even when the stem is being screwed inwardly or outwardly so that the expander 146 is out of engagement with the washer 140.

It thus will be seen that the objects of this invention have been fully and effectively accomplished. It will be realized, however, that the foregoing specific embodiments have been shown and described only for the purpose of illustrating the principles of this invention and are subject to extensive change without departure from such principles. Therefore, this invention includes all modifications encompassed within the spirit and scope of the following claims.

I claim:

1. In apparatus of the class described the combination comprising: a valve assembly adapted to be threaded into one end of a service T and including a tubular exteriorly and interiorly threaded bushing provided with an exterior non-circular portion outwardly of its exterior threads, a tubular valve-stem member threaded into said bushing, a valve-operating rod carried in said stem member for movement between an inner position and an outer position, an expansible valve member surrounding said rod adjacent the inner end of said bushing, said valve member being expanded when said rod is in its said outer position and contracted when said rod is in its said inner position, and a spring engaged with said stem and rod to urge the latter outwardly into its valve-expanding position; and a carrier for said assembly comprising a body having an exterior thread engageable with the interior thread in said bushing, a projection on one end of said body adapted to engage the outer end of said rod to retain the latter in its valve-contracting position when said body is threaded into said bushing, a collar mounted on said body for longitudinal but against rotational movement relative thereto, said collar having longitudinal interior surfaces complementary to and engageable with said bushing non-circular portion to restrain said bushing against rotation relative to said body, and means on the other end of said body to fasten the latter to a rotatable and longitudinally movable carrier-manipulative tool.

2. An assembly for converting, to a valve type, a plain service T having a through bore, an inlet end, an end opposite the inlet end, a lateral outlet, and a removable closure plug threaded into the opposite end, the bore having a section of uniform diameter extending on opposite sides of the outlet, said assembly comprising: an exteriorly threaded bushing adapted to be threaded into and secured in the opposite end of the T in place of the closure plug; tubular stem means threadedly engaged within said bushing for axial adjustment relative thereto; draw rod means slidably mounted for axial adjustment within said stem means; a circular radially-expansible resilient sealing gasket carried on the inner end of one of said means, said gasket, when relaxed, being adapted to have a loose fit in the T bore section; and expander carried on the inner end of the other of said means and effective, on relative axial movement against said gasket by outward movement of said draw rod means, to expand said gasket whereby it is adapted to seal with the wall of the bore section of a T when said assembly is installed therein, axial adjustment of said stem means being adapted to move said gasket within the T bore section from a position on one side of the T lateral outlet to a position on the other side thereof; and spring means engaged with said stem means and said draw rod means for constantly urging the latter outwardly to expand said gasket, the outer end of said bushing having a noncircular exterior configuration and an outer portion of the threads in the interior of said bushing being exposable, whereby a carrier for inserting said assembly into a T can be detachably connected to said assembly against rotation and axial movement relative thereto by engagement with said configuration and said threads' outer portion.

3. An assembly for converting, to a valve type, a plain service T having a through bore, an inlet end, an end opposite the inlet end, a lateral outlet, and a removable closure plug threaded into the opposite end, the bore having a section of uniform diameter extending on opposite sides of the outlet, said assembly comprising: an exteriorly threaded bushing adapted to be threaded into and secured in the opposite end of the T in place of the closure plug; tubular stem means threadedly engaged within said bushing for axial adjustment relative thereto; draw rod means slidably mounted for axial adjustment within said stem means; a circular radially-expansible resilient sealing gasket carried on the inner end of one of said means, said gasket, when relaxed, being adapted to have a loose fit in the T bore section; and expander carried on the inner end of the other of said means and effective, on relative axial movement against said gasket by outward movement of said draw rod means, to expand said gasket whereby it is adapted to seal with the wall of the bore section of a T when said gasket assembly is installed therein, axial adjustment of said stem means being adapted to move said gasket within the T bore section from a position on one side of the T lateral outlet to a position on the other side thereof; and spring means engaged with said stem means and said draw rod means for constantly urging the latter outwardly to expand said gasket, the outer end of said stem means being provided with a noncircular recess for receiving a turning tool and the outer end of said draw rod means projecting into said recess when said gasket is expanded, whereby the insertion of a turning tool into said recess for axially adjusting said stem means automatically effects relative movement away from each other between said expander and said gasket so that the latter will contract out of sealing engagement with the wall of the T bore section.

References Cited in the file of this patent

UNITED STATES PATENTS

| | | |
|---|---|---|
| 913,968 | Nolan | Mar. 2, 1909 |
| 1,996,345 | Mueller | Apr. 2, 1935 |
| 2,213,680 | Share | Sept. 3, 1940 |
| 2,482,687 | Mueller | Sept. 20, 1949 |
| 2,538,288 | Whitsel | Jan. 16, 1951 |
| 2,585,667 | Meador | Feb. 12, 1952 |
| 2,756,486 | Smith | July 31, 1956 |
| 2,784,933 | Newell et al. | Mar. 12, 1957 |
| 2,793,783 | Hutton | May 28, 1957 |